(12) United States Patent
Sirotkin et al.

(10) Patent No.: US 10,009,813 B2
(45) Date of Patent: Jun. 26, 2018

(54) APPARATUS, SYSTEM AND METHOD OF LAWFUL INTERCEPTION (LI) IN A CELLULAR NETWORK

(71) Applicants: Alexander Sirotkin, Giv'on Hachadasha (IL); Geng Wu, Plano, TX (US); Achim Luft, Braunschweig (DE); Alexandre S. Stojanovski, Paris (FR)

(72) Inventors: Alexander Sirotkin, Giv'on Hachadasha (IL); Geng Wu, Plano, TX (US); Achim Luft, Braunschweig (DE); Alexandre S. Stojanovski, Paris (FR)

(73) Assignee: INTEL CORPORATION, Santa Clara, CA (US)

( * ) Notice: Subject to any disclaimer, the term of this patent is extended or adjusted under 35 U.S.C. 154(b) by 517 days.

(21) Appl. No.: 14/129,296

(22) PCT Filed: Oct. 14, 2013

(86) PCT No.: PCT/US2013/064756
§ 371 (c)(1),
(2) Date: Dec. 26, 2013

(87) PCT Pub. No.: WO2014/107208
PCT Pub. Date: Jul. 10, 2014

(65) Prior Publication Data
US 2015/0016413 A1    Jan. 15, 2015

Related U.S. Application Data

(60) Provisional application No. 61/748,706, filed on Jan. 3, 2013.

(51) Int. Cl.
*H04W 88/08*       (2009.01)
*H04W 36/14*       (2009.01)
(Continued)

(52) U.S. Cl.
CPC ............ *H04W 36/14* (2013.01); *H04B 7/024* (2013.01); *H04B 7/0486* (2013.01);
(Continued)

(58) Field of Classification Search
CPC ..... H04L 63/304; H04L 63/306; H04L 63/30; H04W 88/08; H04W 36/0005
See application file for complete search history.

(56) References Cited

U.S. PATENT DOCUMENTS

2004/0203582 A1   10/2004 Dorenbosch et al.
2005/0226193 A1   10/2005 Karhiniemi et al.
(Continued)

FOREIGN PATENT DOCUMENTS

EP       2152032         2/2010
KR    1020110056083      5/2011
(Continued)

OTHER PUBLICATIONS

"Evolved Universal Terrestrial Radio Access (E-UTRA) and Evolved Universal Terrestrial Radio Access Network (E-UTRAN", 3GPP TS 36.300, v11.3.0, Sep. 2012.*
(Continued)

*Primary Examiner* — Noel Beharry
*Assistant Examiner* — Ruihua Zhang
(74) *Attorney, Agent, or Firm* — Shichrur & Co.

(57) ABSTRACT

Some demonstrative embodiments include devices, systems and/or methods of Lawful Interception (LI). For example, a device may communicate a message addressed to an Evolved Node B (eNB) over a cellular communication core network, the message including a Lawful Interception (LI) Information Element (IE) indicating that content corresponding to one or more User Equipment (UEs) connected to the eNB is to be subject to LI.

15 Claims, 2 Drawing Sheets

(51) Int. Cl.

| | |
|---|---|
| *H04W 24/10* | (2009.01) |
| *H04B 7/06* | (2006.01) |
| *H04B 7/04* | (2017.01) |
| *H04J 11/00* | (2006.01) |
| *H04W 72/04* | (2009.01) |
| *H04B 7/024* | (2017.01) |
| *H04W 56/00* | (2009.01) |
| *H04W 72/00* | (2009.01) |
| *H04L 29/06* | (2006.01) |
| *H04W 36/00* | (2009.01) |
| *H04W 48/08* | (2009.01) |
| *H04W 68/00* | (2009.01) |
| *H04W 28/02* | (2009.01) |
| *H04W 36/22* | (2009.01) |
| *H04W 48/16* | (2009.01) |
| *H04W 52/02* | (2009.01) |
| *H04L 12/46* | (2006.01) |
| *H04L 29/12* | (2006.01) |
| *H04W 12/02* | (2009.01) |
| *H04W 76/14* | (2018.01) |
| *H04W 76/10* | (2018.01) |
| *H04W 76/11* | (2018.01) |
| *H04W 88/06* | (2009.01) |
| *H04W 84/12* | (2009.01) |
| *H04L 5/00* | (2006.01) |
| *H04W 88/16* | (2009.01) |
| *H04W 8/08* | (2009.01) |

(52) U.S. Cl.
CPC ......... *H04B 7/0626* (2013.01); *H04B 7/0632* (2013.01); *H04J 11/0053* (2013.01); *H04L 5/0053* (2013.01); *H04L 12/4641* (2013.01); *H04L 61/2007* (2013.01); *H04L 63/304* (2013.01); *H04L 63/306* (2013.01); *H04W 12/02* (2013.01); *H04W 24/10* (2013.01); *H04W 28/0268* (2013.01); *H04W 36/0005* (2013.01); *H04W 36/0055* (2013.01); *H04W 36/22* (2013.01); *H04W 48/08* (2013.01); *H04W 48/16* (2013.01); *H04W 52/0222* (2013.01); *H04W 56/005* (2013.01); *H04W 56/0015* (2013.01); *H04W 56/0095* (2013.01); *H04W 68/00* (2013.01); *H04W 72/005* (2013.01); *H04W 72/042* (2013.01); *H04W 72/0413* (2013.01); *H04W 76/10* (2018.02); *H04W 76/11* (2018.02); *H04W 76/14* (2018.02); *H04W 88/08* (2013.01); *H04L 5/0057* (2013.01); *H04W 8/082* (2013.01); *H04W 36/0011* (2013.01); *H04W 84/12* (2013.01); *H04W 88/06* (2013.01); *H04W 88/16* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/22* (2018.01); *Y02D 70/23* (2018.01)

(56) References Cited

U.S. PATENT DOCUMENTS

| | | |
|---|---|---|
| 2010/0014463 A1 | 1/2010 | Nagai et al. |
| 2010/0159877 A1 | 6/2010 | Salkini et al. |
| 2010/0227610 A1 | 9/2010 | Jabara et al. |
| 2010/0232503 A1 | 9/2010 | Morimoto et al. |
| 2010/0261469 A1 | 10/2010 | Ribeiro et al. |
| 2010/0279672 A1 | 11/2010 | Koskela et al. |
| 2011/0075557 A1 | 3/2011 | Chowdhury et al. |
| 2011/0075675 A1* | 3/2011 | Koodli ............... H04L 12/14 370/401 |
| 2011/0096669 A1 | 4/2011 | Iovieno et al. |
| 2011/0141947 A1 | 6/2011 | Li et al. |
| 2011/0280216 A1 | 11/2011 | Li et al. |
| 2012/0020213 A1 | 1/2012 | Horneman et al. |
| 2012/0214445 A1* | 8/2012 | Stojanovski ......... H04L 63/164 455/411 |
| 2012/0294163 A1 | 11/2012 | Turtinen et al. |
| 2013/0189994 A1* | 7/2013 | Maehara ............... H04W 36/22 455/439 |
| 2013/0203380 A1 | 8/2013 | Lin et al. |
| 2013/0290696 A1 | 10/2013 | Broustis et al. |
| 2013/0326631 A1* | 12/2013 | Cartmell ............... H04L 63/306 726/26 |
| 2014/0160950 A1 | 6/2014 | Vasudevan et al. |
| 2015/0139087 A1 | 5/2015 | Luft et al. |
| 2015/0223257 A1 | 8/2015 | Wilhelmsson et al. |

FOREIGN PATENT DOCUMENTS

| | | |
|---|---|---|
| KR | 1020110138361 | 12/2011 |
| WO | 2014067875 | 5/2014 |

OTHER PUBLICATIONS

3GPP 36.423, 3rd Generation Partnership Project;Technical Specification Group Radio Access Network; Evolved Universal Terrestrial Radio Access Network (E-UTRAN); X2 application protocol (X2AP) (Release 11), v11.3.0 (Dec. 2012).*
3GPP TS 43.033 V11.0.0 (Sep. 2012), 3rd Generation Partnership Project; Technical Specification Group Services and System Aspects; 3G Security; Lawful Interception; Stage 2 (Release 11), 63 pages.
International Search Report and Written Opinion for PCT Patent Application No. PCT/US2013/064756, dated Dec. 31, 2013, 11 pages.
International Search Report and Written Opinion for PCT Patent Application No. PCT/US2013/061630, dated Jan. 13, 2014, 15 pages.
Fodor et al., "Design Aspects of Network Assisted Device-to-Device Communications", IEEE Communications Magazine, Mar. 2012, 8 pages.
ETSI TS 133 106 V10.0.0 (May 2011), Universal Mobile Telecommunications System (UMTS); LTE; Lawful interception requirements (3GPP TS 33.106 version 10.0.0 Release 10), 16 pages.
ETSI TS 133 107 V11.3.0 (Oct. 2012), Universal Mobile Telecommunications System (UMTS); LTE; 3G security; Lawful interception architecture and functions (3GPP TS 33.107 version 11.3.0 Release 11), 137 pages.
3GPP TS 23.401 V10.7.0 (Mar. 2012), 3rd Generation Partnership Project; Technical Specification Group Services and System Aspects; General Packet Radio Service (GPRS) enhancements for Evolved Universal Terrestrial Radio Access Network (E-UTRAN) access (Release 10), 278 pages.
ETSI TS 136 413 V11.1.0 (Oct. 2012), LTE; Evolved Universal Terrestrial Radio Access Network (E-UTRAN); S1 Application Protocol (S1AP) (3GPP TS 36.413 version 11.1.0 Release 11), 270 pages.
3GPP TS 36.423 V11.0.0 (Mar. 2012), 3rd Generation Partnership Project; Technical Specification Group Radio Access Network; Evolved Universal Terrestrial Radio Access Network (E-UTRAN); X2 application protocol (X2AP) (Release 11), 134 pages.
ETSI TS 136 300 V11.3.0 (Nov. 2012), LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), 217 pages.

(56) References Cited

OTHER PUBLICATIONS

Office Action for U.S. Appl. No. 14/125,608, dated Sep. 25, 2015, 30 pages.
Office Action for U.S. Appl. No. 14/125,608, dated May 25, 2016, 33 pages.
International Preliminary Report on Patentability and Written Opinion for International Application No. PCT/US2013/064756, dated Jul. 16, 2015, 7 pages.
Notice of Allowance for U.S. Appl. No. 14/125,608, dated Aug. 12, 2016, 12 pages.
AQSACOM, "Lawful Interception for 3 G and 4G Networks", White Paper, Jan. 2012, 38 pages.
Lei Lei et ai, "Operator Controlled Device-to-Device Communications in LTE-Advanced Networks", IEEE Wireless Communications, Jun. 2012, 9 pages.
Institute for Information Industry (III), "Proximity aware Service consideration on lawful interception", 3GPP TSG-SA WGI SI-120068, Feb. 2012, Meeting #57, Agenda 9.7,3, Kyoto, Japan, 3 pages.
European Search Report for European Patent Application No. 13870368.1 dated Aug. 26, 2016, 9 pages.
"3rd Generation Partnership Project; Technical Specification Group Services and System Aspects; 3G security; Lawful interception architecture and functions (Release 12)", 3GPP Standard; 3GPP TS 33.107, 3rd Generation Partnership Project (3GPP), Mobile Competence Centre 650, Route Des Lucioles ; F-06921 Sophia-Antipolis Cedex ; France, vol. SA WG3, No. V12.1.0, Dec. 20, 2012 (Dec. 20, 2012), 146 pages.
Qualcomm Incorporated et al: "Further analysis for LI PA/SIPTO solution for H(e)NB using a local PDN connection in Solution 1",3GPP Draft; S2-101737, 3rd Generation Partnership Project (3GPP), Mobile Competence Centre ; 650, Route Des Lucioles ; F-06921 Sophia-Antipolis Cedex ; France, vol. SA WG2, no. San Francisco, USA; Feb. 22, 2010, Mar. 2, 2010, 15 pages.

* cited by examiner

Fig. 3

APPARATUS, SYSTEM AND METHOD OF LAWFUL INTERCEPTION (LI) IN A CELLULAR NETWORK

CROSS REFERENCE

This application is a National Phase Application of PCT International Application No. PCT/US2013/064756, International Filing Date Oct. 14, 2013, which in turn claims the benefit of and priority from US Provisional Patent application No. 61/748,706 entitled "Advanced Wireless Communication Systems and Techniques", filed Jan. 3, 2013, the entire disclosures of which are incorporated herein by reference.

CROSS REFERENCE

This application claims the benefit of and priority from U.S. Provisional Patent Application No. 61/748,706 entitled "Advanced Wireless Communication Systems and Techniques", filed Jan. 3, 2013, the entire disclosure of which is incorporated herein by reference.

TECHNICAL FIELD

Some embodiments described herein generally relate to apparatus, system and method of Lawful Interception (LI) in a cellular network.

BACKGROUND

Some communication networks may enable Lawful interception (LI), for example, for obtaining data, for example, communication network data, pursuant to lawful authority, e.g., for the purpose of analysis and/or evidence. The obtained data may include, for example, signaling, network management information, and/or content of communications.

In cellular networks, LI may be performed by an element of a core network, for example, a Gateway (GW), e.g., a Serving Gateway (S-GW) or a Packet-Data-Network (PDN) Gateway (P-GW).

In these cellular networks, the GW may be able to apply the LI to communications, which are processed and/or transferred by the GW. However, the GW may not be able to apply the LI to any other communications of the cellular network, which are not handled by the GW.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including "TS 33.106—3G security; Lawful interception requirements"; "TS 33.107—3G security; Lawful interception architecture and functions"; "TS 23.401—General Packet Radio Service (GPRS) enhancements for Evolved Universal Terrestrial Radio Access Network (E-UTRAN) access"; "TS 36.413—Evolved Universal Terrestrial Radio Access Network (E-UTRAN); S1 Application Protocol (S1AP)"; "TS 36.423—Evolved Universal Terrestrial Radio Access Network (E-UTRAN); X2 Application Protocol (X2AP); and "36.300—Evolved Universal Terrestrial Radio Access (E-UTRA) and Evolved Universal Terrestrial Radio Access Network (E-UTRAN); Overall description; Stage 2")) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012), and/or future versions and/or derivatives thereof, devices and/or networks operating in accordance with existing IEEE 802.16 standards (IEEE—Std 802.16, 2009 Edition, Air Interface for Fixed Broadband Wireless Access Systems; IEEE—Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1XRTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

Figure 1:
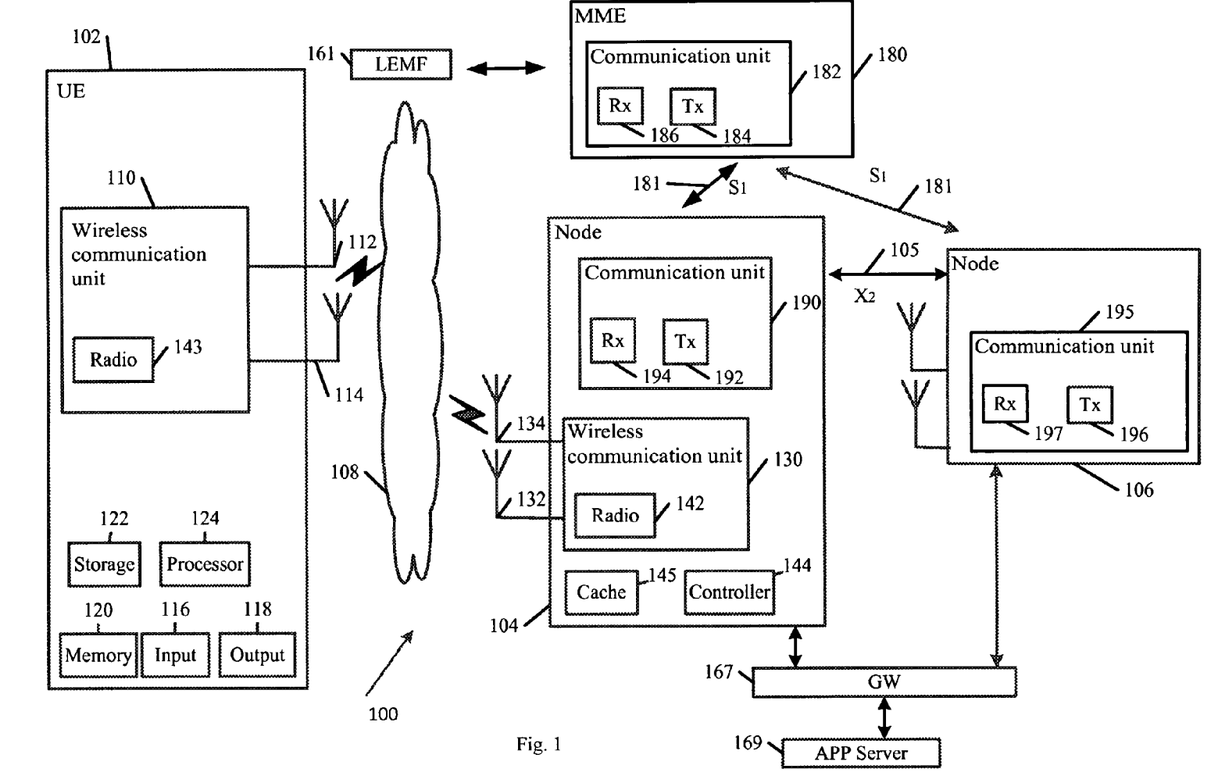
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. Wireless mediums 108 may include, for example, a radio channel, a cellular channel, an RF channel, a WLAN channel, a Wireless Fidelity (WiFi) channel, an IR channel, and the like. One or more elements of system 100 may optionally be capable of communicating over any suitable wired communication links.

In some demonstrative embodiments, system 100 may include one or more cellular networks, e.g., including one or more cells controlled by one or more nodes, e.g., a node 104 and/or a node 106.

In some demonstrative embodiments, nodes 104 and/or 106 may include an Evolved Node B (eNB). For example, nodes 104 and/or 106 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, nodes 104 and/or 106 may include any other functionality and/or may perform the functionality of any other cellular node, e.g., a Node B (NB) or any other node or device.

In some demonstrative embodiments, node 104 may communicate with a User Equipment (UE) 102 via a cellular link. UE 102 may include, for example, a mobile computer, a laptop computer, a notebook computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, node 104 and/or node 106 may include one or more wireless communication units to perform wireless communication between UE 102, node 104, node 106 and/or with one or more other wireless communication devices. For example, UE 102 may include a wireless communication unit 110 and/or nodes 104 and/or 106 may include a wireless communication unit 130.

In some demonstrative embodiments, wireless communication units 110 and 130 may include, or may be associated with, one or more antennas. In one example, wireless communication unit 110 may be associated with at least two antennas, e.g., antennas 112 and 114; and/or wireless communication unit 130 may be associated with at least two antennas, e.g., antennas 132 and 134. In other embodiments, wireless communication units 110 and/or 130 may be associated with any other number of antennas.

In some demonstrative embodiments, antennas 112, 114, 132 and/or 134 may include any type of antennas suitable for transmitting and/or receiving wireless communication signals, blocks, frames, transmission streams, packets, messages and/or data. For example, antennas 112, 114,132 and/or 134 may include any suitable configuration, structure and/or arrangement of one or more antenna elements, components, units, assemblies and/or arrays. For example, antennas 112, 114, 132 and/or 134 may include a phased array antenna, a dipole antenna, a single element antenna, a set of switched beam antennas, and/or the like.

In some embodiments, antennas 112, 114, 132 and/or 134 may implement transmit and receive functionalities using separate transmit and receive antenna elements. In some embodiments, antennas 112, 114, 132 and/or 134 may implement transmit and receive functionalities using common and/or integrated transmit/receive elements.

In some demonstrative embodiments, wireless communication unit 130 may include one or more radios 142, and/or wireless communication unit 110 may include one or more radios 143. For example, radios 142 and/or 143 may include one or more wireless transmitters, receivers and/or transceivers able to send and/or receive wireless communication signals, RF signals, frames, blocks, transmission streams, packets, messages, data items, and/or data.

In some demonstrative embodiments, radios 143 and/or 142 may include at least a cellular transceiver to communicate between US 102 and nodes 104 and/or 106 over a cellular link.

In some demonstrative embodiments, radios 142 and/or 143 may include a multiple input multiple output (MIMO) transmitters receivers system (not shown), which may be capable of performing antenna beamforming methods, if desired.

In some demonstrative embodiments, radios 142 and/or 143 may include a turbo decoder and/or a turbo encoder (not shown) for encoding and/or decoding data bits into data symbols, if desired.

In some demonstrative embodiments, radios 142 and/or 143 may include OFDM and/or SC-FDMA modulators and/or demodulators (not shown) configured to communicate OFDM signals over downlink channels, e.g., between node 104 and UE 102, and SC-FDMA signals over uplink channels, e.g., between UE 102 and nodes 104 and/or 106.

In some demonstrative embodiments, system 100 may include one or more elements of a cellular network. For example, system 100 may also include a Mobility Management Entity (MME) 180.

In some demonstrative embodiments, MME 180 may be configured to perform network access control, for example, facilitating access of UE 102 to the cellular network. Additionally or alternatively, MME 180 may be configured to perform Mobility Management. Additionally or alternatively, MME 180 may be configured to perform tracking area management, e.g., by allocating and reallocating a tracking area identity list to a UE, e.g., UE 102. MME 180 may perform any other additional/and/or alternative functionality.

In some demonstrative embodiments, MME 180, node 104 and/or node 106 may include one or more communication units to perform communication between MME 180, node 104, node 106 and/or with one or more other cellular network devices, e.g., one or more Core Network (CN) devices. For example, MME 180 102 may include a communication unit 182, node 104 may include a communication unit 190 and/or node 106 may include a communication unit 195.

In some demonstrative embodiments, wireless communication unit 130 and communication unit 190 may be implemented as separate elements of node 106. In other embodiments, one or more elements of wireless communication unit 130 may perform one or more functionalities of communication unit 190; and/or one or more elements of communication unit 190 may perform one or more functionalities of communication unit 130.

In some demonstrative embodiments, communication unit 182 may include one or more message senders (also referred to as "transmitters" (Tx)) 184 and/or one or more messages receivers ("receivers" (Rx)) 186; communication unit 190 may include one or more transmitters (Tx) 192 and/or one or more receivers (Rx) 194; and/or communication unit 195 may include one or more transmitters (Tx) 196 and/or one or more receivers (Rx) 197.

In some demonstrative embodiments, MME 180 may communicate with nodes 104 and/or 106 via one or more interface links, for example, S1 Application Protocol (S1AP or S1) links, e.g., S1-MME links 181. For example, messages senders 184, 192 and/or 196 may include S1AP message senders configured to send messages over the S1AP links; and/or receivers 186, 194 and/or 197 may include S1AP receivers configured to receive messages over the S1AP links.

In some demonstrative embodiments, nodes 104 and 106 may communicate via one or more interface links, for example, X2 Application protocol (X2 or X2AP) links 105. For example, message senders 184, 192 and/or 196 may include X2AP message senders configured to send messages over X2 links 105; and/or receivers 186, 194 and/or 197 may include X2AP receivers configured to receive messages over X2 links 105.

In some demonstrative embodiments, UE 102, node 104, node 106 and/or MME 180 may also include, for example, one or more of a processor 124, an input unit 116, an output unit 118, a memory unit 120, and a storage unit 122. UE 102, node 104, node 106 and/or MME 180 may optionally include other suitable hardware components and/or software components. In some demonstrative embodiments, some or all of the components of one or more of UE 102, node 104, node 106 and/or MME 180 may be enclosed in a common housing or packaging, and may be interconnected or operably associated using one or more wired or wireless links. In other embodiments, components of one or more of UE 102, node 104, node 106 and/or MME 180 may be distributed among multiple or separate devices.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102, node 104, node 106 and/or MME 180 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102, node 104, node 106 and/or MME 180.

In some demonstrative embodiments, MME 180 may be configured to manage Lawful Interception (LI) within system 100. For example, MME 180 may receive LI configuration information to configure the LI, e.g., in accordance with LI requirements of a Law Enforcement Monitoring Facility (LEMF) 161. In one example, MME 180 may receive the LI configuration information from LEMF 161 via an Administration Function (ADMF) interface and/or any other interface.

In some demonstrative embodiments, the LI may be applied with respect to content communicated with UE 102, e.g., as described below.

In some demonstrative embodiments, one or more elements ("LI handling elements") of system 100 may be configured to perform LI with respect to content processed by, transferred through and/or handled by the LI handling elements, e.g., as described below.

In some demonstrative embodiments, the LI handling elements may include at least one Core Network (CN) entity of the cellular network, which may be configured to perform LI with respect to content handled by, processed by and/or transferred by the CN entity.

In some demonstrative embodiments, the CN entity may include a GW 167. The GW 167 may interface, for example, between nodes 104 and/or 106 and one or more application servers 169, which may exchange content with UE 102, e.g., via nodes 104 and/or 106. For example, GW 167 may include a Serving Gateway (S-GW), a Packet-Data-Network (PDN) Gateway (P-GW), or any other GW.

In some demonstrative embodiments, performing LI at GW 167 may not be enough to assure LI is performed with respect to all content communicated with UE 102, for example, if some of the content which is communicated with UE 102 is not handled by, processed by and/or transferred by GW 167, e.g., as described below.

In some demonstrative embodiments, a node, e.g., node 104 and/or 106, my be configured to enable performing LI for one or more UEs, e.g., UE 102, connected to the node, as described below.

In some demonstrative embodiments, node 104 may be configured to receive an indication ("LI indication") that UE 102 is to be subject to LI and/or that node 104 is to enable LI for UE 102.

In some demonstrative embodiments, node 104 may receive the LI indication from a network entity, e.g., MME 180, for example, via an S1 link 181, e.g., as described below.

In some demonstrative embodiments, node 104 may receive the LI indication from another node, e.g., node 106, for example, via X2 link 105, e.g., as described below.

In some demonstrative embodiments, node 104 may include a controller 144 configured to disable one or more operations with respect to content to be communicated with UE 102, for example, based on the Li indication, e.g., as described below.

In some demonstrative embodiments, the one or more operations may include operations ("LI disturbing operations"), which may affect and/or disturb an ability to apply LI to the content communicated with UE 102, e.g., as described below.

In some demonstrative embodiments, disabling the one or more LI disturbing operations with respect to the content to be communicated with UE 102 may enable performing LI with respect to the content, e.g., as described below.

In one example, disabling the one or more LI disturbing operations with respect to the content to be communicated with UE 102 may enable ensuring that content which has not been subject to LI is not to be communicated with UE 102, e.g., as described below.

In another example, disabling the one or more LI disturbing operations with respect to the content to be communicated with UE 102 may enable informing a LI entity, e.g., LEMF 161 regarding content which communicated with UE 102, e.g., as described below.

In some demonstrative embodiments, node 104 may disable the one or more LI disturbing operations with respect to content communicated between node 104 and UE 102. The content may include, for example, content, which has not been communicated via a CN entity and/or is not subject to LI by the CN entity, for example, a LI handling element, e.g., GW 167. According to this example, node 104 disables the one or more operations with respect to content communicated between node 104 and UE 102, and which has not be subject to LI by GW 167.

In some demonstrative embodiments, node 104 may be configured to perform edge caching, e.g., as described below.

In some demonstrative embodiments, node 104 may include at least one cache 145 to internally store content communicated with one or more UEs, for example, UE 102, e.g., content requested by UE 102 and/or content received from UE 102.

In some demonstrative embodiments, node 104 may retrieve the content from cache 145, for example, instead of retrieving the content from the CN, e.g., via GW 167. In one example, node 104 may communicate the content retrieved from cache 145 to UE 102 and/or to one or more other UEs, e.g., upon receiving a request for content, which is stored in cache 145. In another example, node 104 may utilize any other caching mechanism and/or algorithms, for example, proactive caching, to manage internal caching of content in cache 145.

In some demonstrative embodiments, the content retrieved from internal cache 145 of node 104 may not be subject to LI by the CN entity performing the LI, e.g., GW 167.

In some demonstrative embodiments, controller 144 may be configured to disable edge caching of content to be communicated with UE 102, for example, based on the LI indication, e.g., as described below.

In some demonstrative embodiments, node 104 may be configured to perform traffic offloading, for example, by communicating content via one or more routes, which do not involve the CN entity performing the LI, e.g., GW 167.

For example, node 104 may be configured to communicate with a network, e.g., the Internet, directly or via any other route not involving the CN entity performing the LI. According to this example, node 104 may be able to communicate content between the Internet and UE 102, e.g., without the content being subject to LI by GW 167.

In one example, node 104 may be configured to perform the offloading according to a Selected Internet-Protocol (IP) Traffic Offload (SIPTO) at Local Network (SIPTO@LN) mechanism, or any other offloading mechanism.

In some demonstrative embodiments, controller 144 may be configured to disable traffic offloading, e.g., SIPTO@LN or any other traffic offloading, of content to be communicated with UE 102, for example, based on the LI indication, e.g., as described below.

In some demonstrative embodiments, one or more elements of system 100 may be configured to enable notifying a node, e.g., node 104, that at least one UE connected to the node, e.g., UE 102, is subject to LI.

In some demonstrative embodiments, receiver 194 may be configured to receive a message including a LI Information Element (IE) indicating node 104 is to enable LI for one or more UEs connected to node 104, e.g., as described below.

In some demonstrative embodiments, the LI IE may be sent by MME 180, e.g., by message sender 184, for example, via S1AP signaling, e.g., over S1 link 181.

In some demonstrative embodiments, the LI IE may be sent by node, e.g., by message sender 196, for example, via X2AP signaling, e.g., over X2 link 105.

In some demonstrative embodiments, controller 144 may be configured to take actions to make the content accessed by the UEs, which are subject to LI, available for LI.

In some demonstrative embodiments, the LI notification to node 104 may relate to one or more particular UEs, for example, to indicate that the one or more particular UEs are to be subject to LI, e.g., while one or more other UEs may not be subject to LI. In one example, the LI IE may indicate that UE 102 is to be subject to LI, e.g., while one or more other UEs are not to be subject to LI.

In some demonstrative embodiments, controller 144 may disable, e.g., based on the LI IE, one or more operations with respect to content to be communicated with the one or more UEs, which are subject to LI.

In some demonstrative embodiments, the LI notification to node 104 may globally relate to all UEs connected to node 104, for example, to indicate all UEs connected to node 104 are to be subject to LI.

In some demonstrative embodiments, controller 144 may disable, e.g., based on the LI IE, one or more operations with respect to content to be communicated with all UEs connected to node 104.

In some demonstrative embodiments, the actions taken by controller 144 with respect to the UEs, which are indicated to be subject top LI, may include, for example, disabling caching and/or offloading.

For example, controller 144 may control node 104 to disable caching and/or offloading with respect to content to be communicated with UE 102, e.g., if the LI indication indicated that UE 102 is to be subject to LI. According to this example, controller 144 may, for example, control node 104 to communicate the content for UE 102 via GW 167, e.g., instead of retrieving the content from cache 145 and/or via the SIPTO@LN mechanism.

In some demonstrative embodiments, the actions taken by controller 144 with respect to the UEs, which are indicated to be subject to LI, may include, for example, notifying one or more CN entities, e.g., GW 167, MME 180, the ADMF and/or any other network entity, about content accessed by the UE, which is indicated to be subject to LI.

In some demonstrative embodiments, the actions taken by controller 144 with respect to the UEs, which are indicated to be subject top LI, may include any other additional or alternative action.

In some demonstrative embodiments, controller 144 may be configured to ensure that the one or more UEs, which are subject to LI, may not be able to detect the LI.

In some demonstrative embodiments, controller 144 may control node 104 to add a delay, e.g., when serving content from cache 145 to the UEs connected to node 104. For example, controller 144 may add the delay, for example, only when some of the UEs are subject to LI, e.g., while one or more other UEs are not subject to LI. According to this example, the LI may not affect normal operation of the node 104 in a manner apparent to UE 102.

In some demonstrative embodiments, MME 180 may receive LI configuration information defining one or more UEs, e.g., including UE 102, to be subject to LI. For example, MME 180 may receive the LI configuration information from LEMF 161, e.g., as described above.

In some demonstrative embodiments, MME 180 may be able to indicate to node 104 that LI is to be enabled with respect to the one or more UEs. For example, MME 180 may indicate to node 104 that node 104 is to disable one or more LI disturbing operations with respect to content to be communicated with the one or more UEs. In one example, MME 180 may indicate to node 104 that node 104 is to disable caching and/or offloading with respect to content to be communicated with the one or more UEs, e.g., as described above.

In one embodiment, MME 180 may be able to indicate to node 104 that the LI disturbing operations are to be selectively disabled one a per-UE basis, e.g., by disabling the LI disturbing operations with respect to one or more UEs, while enabling the LI disturbing operations with respect to one or more other UEs.

For example, MME 180 may send to node 104 a message including the LI IE with an identifier of a UE, e.g., an identifier of UE 102. According to this example, controller 144 may disable the LI disturbing operations with respect to content to be communicated with UE 102.

In one example, MME 180 may send the LI IE to node 104 as part of a UE Context Modification Request message.

For example, the UE Context Modification Request message may be sent by MME 180 to provide to a node, e.g., node 104, UE context information changes with respect to a particular UE, e.g., UE 102.

In one example, the UE Context Modification Request message may include an IE, denoted "Lawful Interception Enabled", having a value set to indicate whether the particular UE is subject to LI, e.g., as follows:

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1APID | M | | 9.2.3.3 | | YES | reject |
| eNB UE S1APID | M | | 9.2.3.4 | | YES | reject |
| Security Key | O | | 9.2.1.41 | A fresh KeNB is provided after performing a key-change on the fly procedure in the MME, see TS 33.401 [15] | YES | reject |
| Subscriber Profile ID for RAT/Frequency priority | O | | 9.2.1.39 | | YES | ignore |
| UE Aggregate Maximum Bit Rate | O | | 9.2.1.20 | | YES | ignore |
| CS Fallback Indicator | O | | 9.2.3.21 | | YES | reject |
| UE Security Capabilities | O | | 9.2.1.40 | | YES | reject |
| CSG Membership Status | O | | 9.2.1.73 | | YES | ignore |
| Registered LAI | O | | 9.2.3.1 | | YES | ignore |
| Lawful Interception Enabled | O | | | | YES | ignore |

In other embodiments, the UE Context Modification Request message may include any other indication that the particular UE is to be subject to LI.

In another example, MME 180 may send the LI IE to node 104 as part of an Initial Context Setup Request Message.

For example, the Initial Context Setup Request Message may be sent by MME 180 to request a node, e.g., node 104, to setup UE context with respect to a particular UE, e.g., UE 102.

In one example, the Initial Context Setup Request Message may include an IE, denoted "Lawful Interception Enabled", having a value set to indicate whether the particular UE is subject to LI, e.g., as follows:

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 to <maxnoof E-RABs> | | | EACH | reject |
| >>E-RAB ID | M | | 9.2.1.2 | | — | |
| >>E-RAB Level QoS Parameters | M | | 9.2.1.15 | Includes necessary QoS parameters | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.2.80 | | YES | ignore |
| Lawful Interception Enabled | O | | | | YES | ignore |

In other embodiments, the Initial Context Setup Request Message may include any other indication that the particular UE is to be subject to LI.

In other embodiments, the indication that the particular UE is to be subject to LI may be included as part of any other message or any other Information Element (IE).

In another embodiment, MME 180 may be able to indicate to node 104 that the LI disturbing operations are to be globally disabled one a per-node basis, e.g., by disabling the LI disturbing operations with respect all UEs connected to node 104.

For example, MME 180 may send to node 104 a message including the LI IE including an indication that the LI disturbing operations are to be disabled with respect to content to be communicated with all UEs connected to node 104. According to this example, controller 144 may disable the LI disturbing operations with respect to content to be communicated with all UEs connected to node 104.

In one example, MME 180 may send the LI IE to node 104 as part of a MME Configuration Transfer Message.

For example, the MME Configuration Transfer Message may be sent by MME 180 to transfer Radio Access Network (RAN) configuration information to node 104.

In one example, the MME Configuration Transfer Message may include an IE, denoted "Lawful Interception", having a value set to indicate whether LI is to be enabled with respect to all UEs connected to the node addressed by the MME Configuration Transfer Message, e.g., as follows:

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| SON Configuration Transfer | O | | 9.2.3.26 | | YES | ignore |
| Lawful Interception | O | | | | YES | ignore |

In other embodiments, the MME Configuration Transfer Message may include any other indication that the UEs connected to the node are to be subject to LI.

In other embodiments, the indication that the UEs connected to the node are subject to LI may be included as part of any other message or any other Information Element (IE).

In another embodiment, MME 180 may be able to indicate to node 104 that the LI disturbing operations are to be disabled for a particular UE upon handover of the particular UE to node 104.

For example, UE 102 may be handed over to node 104, e.g., from node 106. According to this example, MME 180 may send to node 104 a message including the LI IE including an indication that the LI disturbing operations are to be disabled with respect to content to be communicated with UE 102, e.g., upon handover of UE 102 to node 104.

In one example, MME 180 may send the LI IE to node 104 as part of a Handover Request Message.

For example, the Handover Request Message may be sent by MME 180 to node 104, e.g., to request the preparation of resources for handover of UE 102.

In one example, the Handover Request Message may include an IE, denoted "Lawful Interception Enabled", having a value set to indicate whether LI is to be enabled with respect to the particular UEs being handed over, e.g., as follows:

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| Handover Type | M | | 9.2.1.13 | | YES | reject |
| Cause | M | | 9.2.1.3 | | YES | ignore |
| UE Aggregate Maximum Bit Rate | M | | 9.2.1.20 | | YES | reject |
| E-RABs To Be Setup List | | 1 | | | YES | reject |
| >E-RABs To Be Setup Item IEs | | 1 to <max noof E-RABs> | | | EACH | reject |
| >>E-RAB ID | M | | 9.2.1.2 | | — | |
| >>Transport Layer Address | M | | 9.2.2.1 | | — | |
| >>GTP-TEID | M | | 9.2.2.2 | To deliver UL PDUs | — | |
| >>E-RAB Level QoS Parameters | M | | 9.2.1.15 | Includes necessary QoS parameters | — | |
| >>Data Forwarding Not Possible | O | | 9.2.1.76 | | YES | ignore |
| Source to Target Transparent Container | M | | 9.2.1.56 | | YES | reject |
| UE Security Capabilities | M | | 9.2.1.40 | | YES | reject |
| Handover Restriction List | O | | 9.2.1.22 | | YES | ignore |
| Trace Activation | O | | 9.2.1.4 | | YES | ignore |
| Request Type | O | | 9.2.1.34 | | YES | ignore |
| SRVCC Operation Possible | O | | 9.2.1.58 | | YES | ignore |
| Security Context | M | | 9.2.1.26 | | YES | reject |
| NAS Security Parameters to E-UTRAN | C-ifromUTRANGERAN | | 9.2.3.31 | The eNB shall use this IE as specified in TS 33.401 [15]. | YES | reject |

TABLE 4-continued

| IE/Group Name | Presence | Range | IE type and reference | Semantics description | Criticality | Assigned Criticality |
|---|---|---|---|---|---|---|
| CSG Id | O | | 9.2.1.62 | | YES | reject |
| CSG Membership Status | O | | 9.2.1.73 | | YES | ignore |
| GUMMEI | O | | 9.2.3.9 | This IE indicates the MME serving the UE | YES | ignore |
| MME UE S1AP ID 2 | O | | 9.2.3.3 | This IE indicates the MME UE S1AP ID assigned by the MME | YES | ignore |
| Management Based MDT Allowed | O | | 9.2.1.83 | | YES | ignore |
| Lawful Interception Enabled | O | | | | YES | ignore |

In other embodiments, the Handover Request Message may include any other indication that the UE being handed over is to be subject to LI.

In other embodiments, the indication that the UE being handed over is subject to LI may be included as part of any other message or any other Information Element (IE).

In some demonstrative embodiments, nodes 104 and 106 may communicate a message including the LI IE indicating node 104 is to enable LI of content corresponding to one or more UEs connected to node 104, e.g., as described below.

In some demonstrative embodiments, node 106 may transmit the LI IE as part of a handover of a UE from node 106 to node 104, e.g., to indicate the UE is to be subject to LI. For example, message sender 196 may send over X2 link 105 an X2AP message including an indication of a UE, e.g., UE 102, to be handed over from node 106 to node 104. The X2AP message may include the LI IE to indicate that the UE is to be subject to LI. According to this example, receiver 194 may receive the X2AP message, and controller 144 may disable, based on the LI IE, one or more operations, e.g., edge caching and/or offloading, with respect to content to be communicated with the UE being handed over, e.g., UE 102.

In one example, node 106 may transmit the LI IE to node 104 as part of a Handover Request Message.

For example, the Handover Request Message may be sent by node 106 to node 104, e.g., to request the preparation of resources for handover of UE 102.

In one example, the Handover Request Message may include an IE, denoted "Lawful Interception Enabled", having a value set to indicate whether LI is to be enabled with respect to the particular UEs being handed over, e.g., as follows:

TABLE 5

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER (0 ... $2^{32}$ − 1) | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |

TABLE 5-continued

| IE/Group Name | Presence | Range | IE type and reference | Semantics description | Criticality | Assigned Criticality |
|---|---|---|---|---|---|---|
| >E-RABs To Be Setup List | | 1 | | | — | — |
| >>E-RABs To Be Setup Item | | 1 . . . <max noof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |
| >RRC Context | M | | OCTET STRING | Includes the RRC Handover Preparation Information message as defined in subclause 10.2.2 of TS 36.331 [9] | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 [4] | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Mobility Information | O | | BIT STRING (SIZE (32)) | Information related to the handover; the source eNB provides it in order to enable later analysis of the conditions that led to a wrong HO. | YES | ignore |
| Lawful Interception Enabled | O | | | | YES | ignore |

In other embodiments, the Handover Request Message may include any other indication that the UE being handed over is to be subject to LI.

In other embodiments, the indication that the UE being handed over is subject to LI may be included as part of any other message or any other Information Element (IE).

Figure 2:
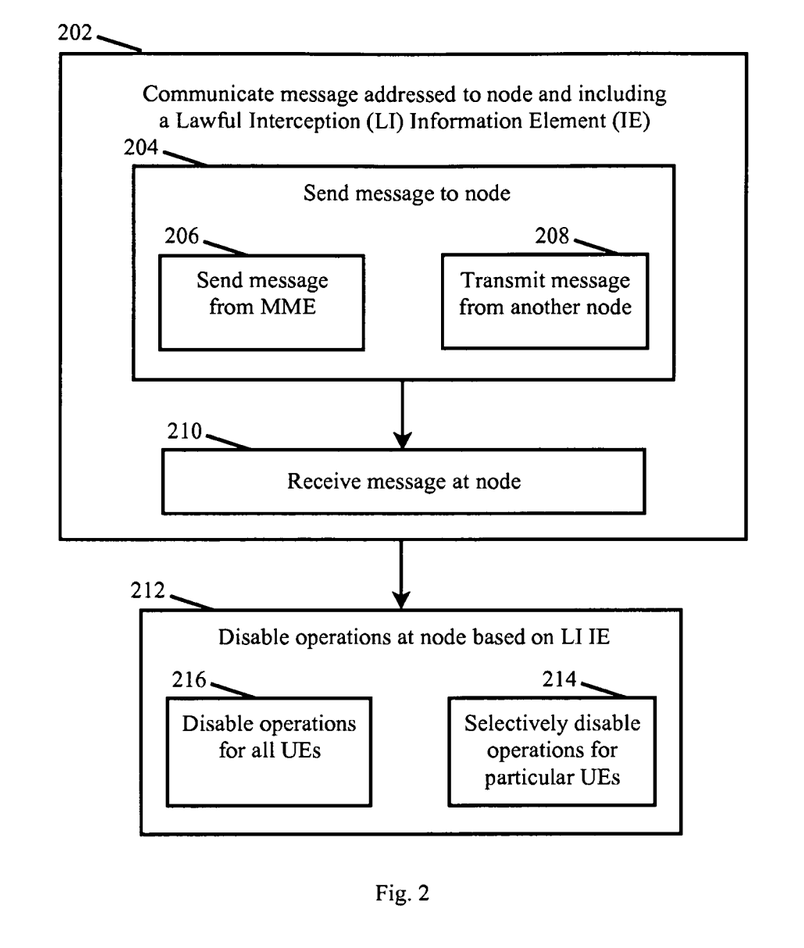
FIG. 2 is a schematic flow-chart illustration of a method of Lawful Interception (LI), in accordance with some demonstrative embodiments.

Reference is made to FIG. 2, which schematically illustrates a method of lawful interception, in accordance with some demonstrative embodiments. In some embodiments, one or more of the operations of the method of FIG. 2 may be performed by a wireless communication system e.g., system 100 (FIG. 1); a node, e.g., node 104 (FIG. 1) and/or node 106 (FIG. 1); and MME, e.g., MME 180 (FIG. 1); a communication unit, e.g., communication units 182, 190 and/or 1195 (FIG. 1); and/or a controller, e.g., controller 144 (FIG. 1).

As indicated at block 202, the method may include communicating a message addressed to a cellular node, e.g., an eNB, over a cellular communication network, the message including a LI IE indicating that content corresponding to one or more UEs connected to the cellular node is to be subject to LI.

As indicated at block 204, the method may include sending the message to the cellular node.

As indicated at block 206, the method may include sending the message from an MME to the cellular node. For example, MME 180 (FIG. 1) may send the message including the LI IE to node 104 (FIG. 1), e.g., as described above.

As indicated at block 208, the method may include transmitting the message from another cellular node to the cellular node. For example, node 106 (FIG. 1) may transmit the message including the LI IE to node 104 (FIG. 1), e.g., as described above. For example, the message may include a handover request message including an indication of a UE to be handed over to the cellular node.

As indicated at block 210, the method may include receiving the message by the cellular node. For example, node 104 (FIG. 1) may receive the message including the LI IE, e.g., as described above.

As indicated at block 212, the method may include disabling for the one or more UEs one or more operations, e.g., edge caching and/or traffic offloading, based on the LI IE. For example, controller 144 (FIG. 1) may disable, e.g., based on the LI IE, one or more LU disturbing operations, e.g., edge caching and/or offloading, with respect to content to be communicated with one or more UEs connected to node 104 (FIG. 1), e.g., as described above.

As indicated at block 214, the method may include selectively disabling one or more operations with respect to content corresponding to one or more UEs connected to the cellular node. For example, controller 145 (FIG. 1) may selectively disable, e.g., based on the LI IE, one or more LU disturbing operations, e.g., edge caching and/or offloading, with respect to content to be communicated with one or more particular UEs connected to node 104 (FIG. 1), e.g., as described above.

As indicated at block 216, the method may include disabling one or more operations with respect to content corresponding to all UEs connected to the cellular node. For example, controller 145 (FIG. 1) may disable, e.g., based on the LI IE, one or more LU disturbing operations, e.g., edge caching and/or offloading, with respect to content to be communicated with all UEs connected to node 104 (FIG. 1), e.g., as described above.

Figure 3:
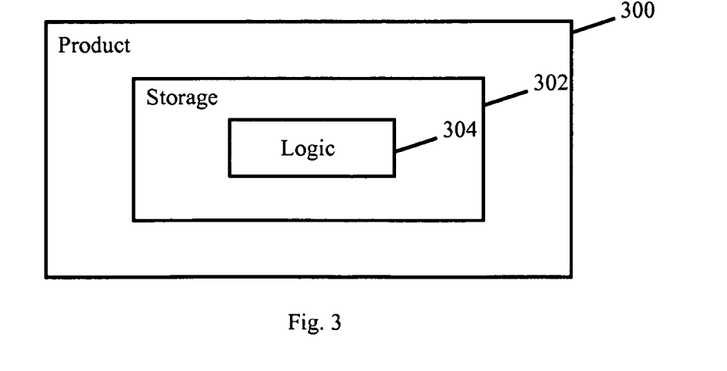
FIG. 3 is a schematic illustration of a product, in accordance with some demonstrative embodiments.

Reference is made to FIG. 3, which schematically illustrates a product of manufacture 300, in accordance with some demonstrative embodiments. Product 300 may include a non-transitory machine-readable storage medium 302 to store logic 304, which may be used, for example, to perform at least part of the functionality of MME 180 (FIG. 1), node 104 (FIG. 1), node 106 (FIG. 1), communication unit 182 (FIG. 1), communication unit 190 (FIG. 1), communication unit 195 (FIG. 1), and/or controller 144 (FIG. 1) and/or to perform one or more operations of the method of FIG. 2. The phrase "non-transitory machine-readable medium" is directed to include all computer-readable media, with the sole exception being a transitory propagating signal.

In some demonstrative embodiments, product 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an Evolved Node B (eNB) comprising two or more antennas; a receiver to receive a message including a Lawful Interception (LI) Information Element (IE) indicating the eNB is to enable LI for one or more User Equipment (UEs) connected to the eNB; and a controller to disable, based on the LI IE, one or more operations with respect to content to be communicated with the one or more UEs.

Example 2 includes the subject matter of Example 1 and optionally, wherein the one or more operations comprise at least one operation selected from the group consisting of edge caching and traffic offloading.

Example 3 includes the subject matter of Example 2 and optionally, wherein the traffic offloading comprises Selected Internet-Protocol (IP) Traffic Offload (SIPTO) at Local Network (SIPTO@LN).

Example 4 includes the subject matter of any one of Examples 1-3 and optionally, wherein the content comprises content, for which LI cannot be performed by a network entity of a Core Network (CN).

Example 5 includes the subject matter of Example 4 and optionally, wherein the network entity comprises a Serving Gateway (S-GW) or a Packet Data Network (PDN) Gateway (P-GW).

Example 6 includes the subject matter of any one of Examples 1-5 and optionally, wherein the receiver is to receive the message from a Mobility Management Entity (MME).

Example 7 includes the subject matter of Example 6 and optionally, wherein the message comprises an identifier of a UE, and wherein the controller is to disable the one or more operations with respect to content to be communicated with the UE.

Example 8 includes the subject matter of Example 7 and optionally, wherein the message includes a UE context modification request message or an initial context setup request message.

Example 9 includes the subject matter of Example 6 and optionally, wherein based on the message the eNB is to disable the one or more operations with respect to content to be communicated with all UEs connected to the eNB.

Example 10 includes the subject matter of Example 9 and optionally, wherein the message comprises a MME configuration transfer message.

Example 11 includes the subject matter of Example 6 and optionally, wherein the message comprises a handover request message including an indication of a UE to be handed over to the eNB.

Example 12 includes the subject matter of any one of Examples 1-5 and optionally, wherein the receiver is to receive the message from another eNB.

Example 13 includes the subject matter of Example 12 and optionally, wherein the message comprises a handover request message from the other eNB, the handover request message including an identifier of a UE to be handed over from the other eNB to the eNB and to be enabled for LI.

Example 14 includes a cellular communication system comprising a first Evolved Node B (eNB) to transmit to a second eNB a handover request message including an indication of a User Equipment (UE) to be handed over from the first eNB to the second eNB, the message including a Lawful Interception (LI) Information Element (IE) indicating the second eNB is to enable LI of content to be communicated with the UE.

Example 15 includes the subject matter of Example 14 and optionally, wherein the content comprises content, for which LI cannot be performed by a network entity of a Core Network (CN).

Example 16 includes the subject matter of Example 15 and optionally, wherein the network entity comprises a Serving Gateway (S-GW) or a Packet Data Network PDN) Gateway (P-GW).

Example 17 includes the subject matter of any one of Examples 14-16 and optionally, wherein the IE is to indicate to the second eNB to disable for the UE one or more operations selected from the group consisting of edge caching and traffic offloading.

Example 18 includes the subject matter of Example 17 and optionally, wherein the traffic offloading comprises Selected Internet-Protocol (IP) Traffic Offload (SIPTO) at Local Network (SIPTO@LN).

Example 19 includes the subject matter of any one of Examples 14-18 and optionally, wherein the handover request message comprises an X2 Application Protocol (X2AP) message.

Example 20 includes a Mobility Management Entity (MME) comprising a message sender to send to an Evolved Node B (eNB) a message including a Lawful Interception (LI) Information Element (IE) indicating the eNB is to enable LI with respect to one or more User Equipment (UEs) connected to the eNB.

Example 21 includes the subject matter of Example 20 and optionally, wherein the LI IE is to indicate the eNB is to disable for the one or more UEs one or more operations selected from the group consisting of edge caching and traffic offloading.

Example 22 includes the subject matter of Example 21 and optionally, wherein the traffic offloading comprises Selected Internet-Protocol (IP) Traffic Offload (SIPTO) at Local Network (SIPTO@LN).

Example 23 includes the subject matter of any one of Examples 20-22 and optionally, wherein the message comprises an identifier of a UE to be subject to LI.

Example 24 includes the subject matter of Example 23 and optionally, wherein the message includes a UE context modification request message or an initial context setup request message.

Example 25 includes the subject matter of any one of Examples 20-22 and optionally, wherein the LI IE is to indicate that all UEs connected to the eNB are to be subject to LI.

Example 26 includes the subject matter of Example 25 and optionally, wherein the message comprises a MME configuration transfer message.

Example 27 includes the subject matter of any one of Examples 20-22 and optionally, wherein the message comprises a handover request message including an indication of a UE to be handed over to the eNB.

Example 28 includes a method comprising communicating a message addressed to an Evolved Node B (eNB) over a cellular communication network, the message including a Lawful Interception (LI) Information Element (IE) indicating that content corresponding to one or more User Equipment (UEs) connected to the eNB is to be subject to LI.

Example 29 includes the subject matter of Example 28 and optionally, comprising receiving the message by the eNB.

Example 30 includes the subject matter of Example 28 or 29 and optionally, wherein the content comprises content, for which LI cannot be performed by a network entity of a Core Network (CN)

Example 31 includes the subject matter of Example 30 and optionally, wherein the network entity comprises a Serving Gateway (S-GW) or a Packet Data Network (PDN) Gateway (P-GW).

Example 32 includes the subject matter of any one of Examples 29-31 and optionally, comprising disabling for the one or more UEs one or more operations selected from the group consisting of edge caching and traffic offloading.

Example 33 includes the subject matter of Example 32 and optionally, wherein the traffic offloading comprises Selected Internet-Protocol (IP) Traffic Offload (SIPTO) at Local Network (SIPTO@LN).

Example 34 includes the subject matter of any one of Examples 29-33 and optionally, comprising receiving the message from a Mobility Management Entity (MME).

Example 35 includes the subject matter of Example 34 and optionally, comprising disabling one or more operations with respect to content corresponding to all UEs connected to the eNB.

Example 36 includes the subject matter of Example 35 and optionally, wherein the message comprises a MME configuration transfer message.

Example 37 includes the subject matter of Example 28 and optionally, comprising sending the message from a Mobility Management Entity (MME) to the eNB.

Example 38 includes the subject matter of Example 34 or 37 and optionally, wherein the message comprises an identifier of a UE to be enabled for LI.

Example 39 includes the subject matter of Example 38 and optionally, wherein the message includes a UE context modification request message or an initial context setup request message.

Example 40 includes the subject matter of Example 34 or 37 and optionally, wherein the message comprises a handover request message including an indication of a UE to be handed over to the eNB.

Example 41 includes the subject matter of any one of Examples 29-33 and optionally, comprising receiving the message from another eNB.

Example 42 includes the subject matter of Example 28 and optionally, comprising transmitting the message from another eNB to the eNB.

Example 43 includes the subject matter of Example 41 or 42 and optionally, wherein the message comprises a handover request message from the other eNB, the handover request message including an identifier of a UE to be handed over from the other eNB to the eNB.

Example 44 includes a product including a non-transitory storage medium having stored thereon instructions that, when executed by a machine, result in communicating a message addressed to an Evolved Node B (eNB) over a cellular communication network, the message including a Lawful Interception (LI) Information Element (IE) indicating content corresponding to one or more User Equipment (UEs) connected to the eNB is to be subject to LI.

Example 45 includes the subject matter of Example 44 and optionally, wherein the instructions result in receiving the message by the eNB.

Example 46 includes the subject matter of Example 44 or 45 and optionally, wherein the content comprises content, for which LI cannot be performed by a network entity of a Core Network (CN).

Example 47 includes the subject matter of Example 46 and optionally, wherein the network entity comprises a Serving Gateway (S-GW) or a Packet Data Network (PDN) Gateway (P-GW).

Example 48 includes the subject matter of any one of Examples 45-47 and optionally, wherein the instructions result in disabling for the one or more UEs one or more operations selected from the group consisting of edge caching and traffic offloading.

Example 49 includes the subject matter of Example 48 and optionally, wherein the traffic offloading comprises Selected Internet-Protocol (IP) Traffic Offload (SIPTO) at Local Network (SIPTO@LN).

Example 50 includes the subject matter of any one of Examples 45-49 and optionally, wherein the instructions result in receiving the message from a Mobility Management Entity (MME).

Example 51 includes the subject matter of Example 50 and optionally, wherein the instructions result in disabling one or more operations with respect to content corresponding to all UEs connected to the eNB.

Example 52 includes the subject matter of Example 51 and optionally, wherein the message comprises a MME configuration transfer message.

Example 53 includes the subject matter of Example 44 and optionally, wherein the instructions result in sending the message from a Mobility Management Entity (MME) to the eNB.

Example 54 includes the subject matter of Example 50 or 53 and optionally, wherein the message comprises an identifier of a UE to be enabled for LI.

Example 55 includes the subject matter of Example 54 and optionally, wherein the message includes a UE context modification request message or an initial context setup request message.

Example 56 includes the subject matter of Example 50 or 53 and optionally, wherein the message comprises a handover request message including an indication of a UE to be handed over to the eNB.

Example 57 includes the subject matter of any one of Examples 45-49 and optionally, wherein the instructions result in receiving the message from another eNB.

Example 58 includes the subject matter of Example 44 and optionally, wherein the instructions result in transmitting the message from another eNB to the eNB.

Example 59 includes the subject matter of Example 57 or 58 and optionally, wherein the message comprises a handover request message from the other eNB, the handover request message including an identifier of a UE to be handed over from the other eNB to the eNB.

Example 60 includes an apparatus comprising means for communicating a message addressed to an Evolved Node B (eNB) over a cellular communication network, the message including a Lawful Interception (LI) Information Element (IE) indicating content corresponding to one or more User Equipment (UEs) connected to the eNB is to be subject to LI.

Example 61 includes the subject matter of Example 60 and optionally, comprising means for receiving the message by the eNB.

Example 62 includes the subject matter of Example 60 or 61 and optionally, wherein the content comprises content, for which LI cannot be performed by a network entity of a Core Network (CN).

Example 63 includes the subject matter of Example 62 and optionally, wherein the network entity comprises a Serving Gateway (S-GW) or a Packet Data Network (PDN) Gateway (P-GW).

Example 64 includes the subject matter of any one of Examples 61-63 and optionally, comprising means for disabling for the one or more UEs one or more operations selected from the group consisting of edge caching and traffic offloading.

Example 65 includes the subject matter of Example 64 and optionally, wherein the traffic offloading comprises Selected Internet-Protocol (IP) Traffic Offload (SIPTO) at Local Network (SIPTO@LN).

Example 66 includes the subject matter of any one of Examples 61-65 and optionally, comprising means for receiving the message from a Mobility Management Entity (MME).

Example 67 includes the subject matter of Example 66 and optionally, comprising means for disabling one or more operations with respect to content corresponding to all UEs connected to the eNB.

Example 68 includes the subject matter of Example 67 and optionally, wherein the message comprises a MME configuration transfer message.

Example 69 includes the subject matter of Example 60 and optionally, comprising means for sending the message from a Mobility Management Entity (MME) to the eNB.

Example 70 includes the subject matter of Example 66 or 69 and optionally, wherein the message comprises an identifier of a UE to be enabled for LI.

Example 71 includes the subject matter of Example 70 and optionally, wherein the message includes a UE context modification request message or an initial context setup request message.

Example 72 includes the subject matter of Example 66 or 69 and optionally, wherein the message comprises a handover request message including an indication of a UE to be handed over to the eNB.

Example 73 includes the subject matter of any one of Examples 61-65 and optionally, comprising means for receiving the message from another eNB.

Example 74 includes the subject matter of Example 60 and optionally, comprising means for transmitting the message from another eNB to the eNB.

Example 75 includes the subject matter of Example 73 or 74 and optionally, wherein the message comprises a handover request message from the other eNB, the handover request message including an identifier of a UE to be handed over from the other eNB to the eNB.

Example 76 includes a cellular node comprising one or more antennas; a receiver to receive a message including a Lawful Interception (LI) Information Element (IE) indicating the cellular node is to enable LI for one or more User Equipment (UEs) connected to the cellular node; and a controller to disable, based on the LI IE, one or more operations with respect to content to be communicated with the one or more UEs.

Example 77 includes the subject matter of Example 76 and optionally, wherein the one or more operations comprise at least one operation selected from the group consisting of edge caching and traffic offloading.

Example 78 includes the subject matter of Example 77 and optionally, wherein the traffic offloading comprises Selected Internet-Protocol (IP) Traffic Offload (SIPTO) at Local Network (SIPTO@LN).

Example 79 includes the subject matter of any one of Examples 76-78 and optionally, wherein the content comprises content, for which LI cannot be performed by a network entity of a Core Network (CN).

Example 80 includes the subject matter of Example 80 and optionally, wherein the network entity comprises a Serving Gateway (S-GW) or a Packet Data Network (PDN) Gateway (P-GW).

Example 81 includes the subject matter of any one of Examples 76-80 and optionally, wherein the receiver is to receive the message from a Mobility Management Entity (MME).

Example 82 includes the subject matter of Example 81 and optionally, wherein the message comprises an identifier of a UE, and wherein the controller is to disable the one or more operations with respect to content to be communicated with the UE.

Example 83 includes the subject matter of Example 82 and optionally, wherein the message includes a UE context modification request message or an initial context setup request message.

Example 84 includes the subject matter of Example 81 and optionally, wherein based on the message the cellular node is to disable the one or more operations with respect to content to be communicated with all UEs connected to the cellular node.

Example 85 includes the subject matter of Example 84 and optionally, wherein the message comprises a MME configuration transfer message.

Example 86 includes the subject matter of Example 81 and optionally, wherein the message comprises a handover request message including an indication of a UE to be handed over to the cellular node.

Example 87 includes the subject matter of any one of Examples 76-80 and optionally, wherein the receiver is to receive the message from another cellular node.

Example 88 includes the subject matter of Example 87 and optionally, wherein the message comprises a handover request message from the other cellular node, the handover request message including an identifier of a UE to be handed over from the other cellular node to the cellular node and to be enabled for LI.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An Evolved Node B (eNB) comprising:
two or more antennas to communicate with one or more User Equipment (UEs) to be connected to said eNB;
a receiver to receive a message from another eNB over an X2 interface, the message comprising a handover request message to handover a UE from the another eNB, the handover request message comprising an X2 Application Protocol (X2AP) Identifier (ID) of the UE, and a Lawful Interception (LI) Information Element (IE) indicating whether LI is to be enabled with respect to the UE; and
a controller configured to selectively enable the eNB to perform at least one of edge caching or traffic offloading with respect to content to be communicated with the one or more UEs to be connected to the eNB, the controller is configured to, based on said LI IE in the handover request message, enable the LI with respect to the UE to be handed over from the another eNB, the controller is configured to enable the LI with respect to the UE by disabling one or more operations with respect to content to be communicated with said UE, disabling the one or more operations comprising disabling at least one of the edge caching or traffic offloading with respect to the content to be communicated with the UE.

2. The eNB of claim 1, wherein the edge caching comprises internally storing at said eNB the content to be communicated with the UE.

3. The eNB of claim 1, wherein said traffic offloading comprises Selected Internet-Protocol (IP) Traffic Offload (SIPTO) at Local Network (SIPTO@LN).

4. The eNB of claim 1, wherein the content to be communicated with the UE comprises content, for which LI cannot be performed by a network entity of a Core Network (CN).

5. The eNB of claim 1, wherein based on said message said eNB is to disable said one or more operations with respect to content to be communicated with all UEs connected to said eNB.

6. A cellular communication system comprising:
a first Evolved Node B (eNB) comprising:
one or more antennas to communicate with one or more User Equipment (UE);
a controller; and
a message transmitter,
the controller configured to selectively enable the first eNB to perform at least one of edge caching or traffic offloading with respect to content to be communicated with the one or more UEs, the controller configured to enable Lawful Interception (LI) with respect to a UE of the one or more UEs by disabling at least one of the edge caching or traffic offloading with respect to content to be communicated with the UE, the controller configured to cause the message transmitter to transmit to a second eNB an X2 Application Protocol (X2AP) message over an X2 interface, the X2AP message comprising a handover request message comprising an X2AP identifier (ID) of the UE to indicate that the UE is to be handed over from said first eNB to said second eNB, said X2AP message comprising an LI Information Element (IE) indicating said second eNB is to enable the LI with respect to said UE, said LI IE is to indicate to said second eNB to enable the LI with respect to the UE by disabling for said UE at least one of the edge caching or traffic offloading with respect to the content to be communicated with the UE.

7. The system of claim 6, wherein said traffic offloading comprises Selected Internet-Protocol (IP) Traffic Offload (SIPTO) at Local Network (SIPTO@LN).

8. A method comprising:
communicating a message addressed to a first Evolved Node B (eNB) over a cellular communication network from a second eNB over an X2 interface, the message comprising a handover request message comprising an X2 Application Protocol (X2AP) Identifier (ID) of a User Equipment (UE) to be handed over from said second eNB to said first eNB, and a Lawful Interception (LI) Information Element (IE) indicating that content corresponding to the UE to be handed over to said first eNB is to be subject to LI at the first eNB, said LI IE is to indicate to said first eNB to enable the LI for the UE by disabling for said UE one or more LI-disturbing operations with respect to content to be communicated with the UE, the one or more LI-disturbing operations comprising one or more operations selected from the group consisting of edge caching and traffic offloading with respect to the content to be communicated with the UE.

9. The method of claim 8 comprising receiving said message by said first eNB.

10. The method of claim 9 comprising disabling for said UE the one or more operations selected from the group consisting of edge caching and traffic offloading.

11. The method of claim 8 comprising transmitting said message from the second eNB to said first eNB.

12. A product comprising a non-transitory storage medium having stored thereon instructions that, when executed by a machine, result in:
communicating a message addressed to a first Evolved Node B (eNB) over a cellular communication network from a second eNB over an X2 interface, the message comprising a handover request message comprising an X2AP identifier (ID) of a User Equipment (UE) to be handed over from said second eNB to said first eNB, and a Lawful Interception (LI) Information Element (IE) indicating that content corresponding to the UE to be handed over to said first eNB is to be subject to LI at the first eNB, said LI IE is to indicate to said first eNB to enable the LI for the UE by disabling for said UE one or more LI-disturbing operations with respect to content to be communicated with the UE, the one or more LI-disturbing operations comprising one or more operations selected from the group consisting of edge caching and traffic offloading with respect to the content to be communicated with the UE.

13. The product of claim 12, wherein said instructions result in receiving said message by said first eNB.

14. The product of claim 13, wherein said instructions result in disabling for said UE the one or more operations selected from the group consisting of edge caching and traffic offloading.

15. The product of claim 12, wherein said instructions result in receiving said message from the second eNB.

* * * * *